Jan. 3, 1939. G. G. KRUESI 2,142,133
RADIO DIRECTION FINDER
Filed Nov. 25, 1933 7 Sheets-Sheet 5
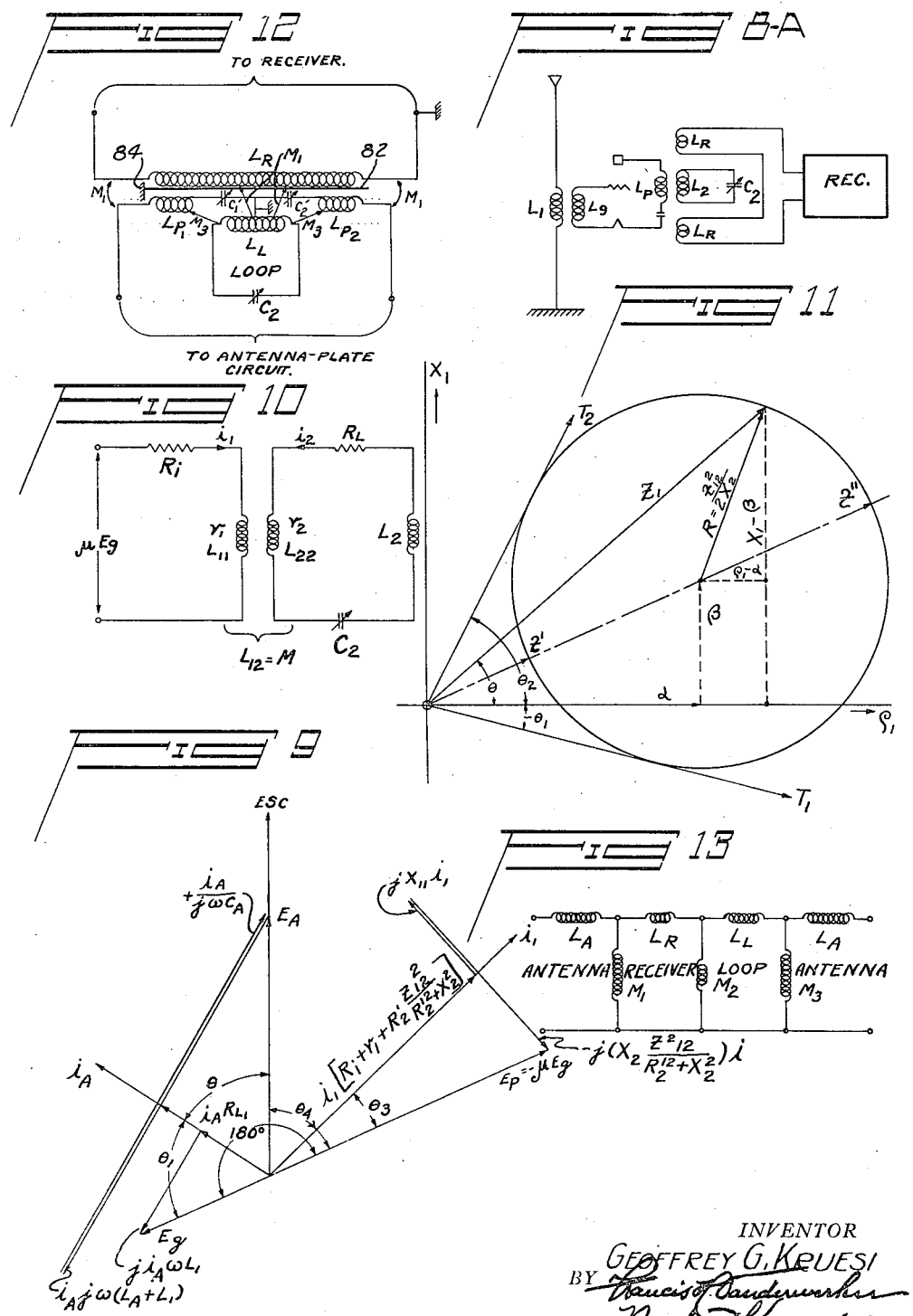

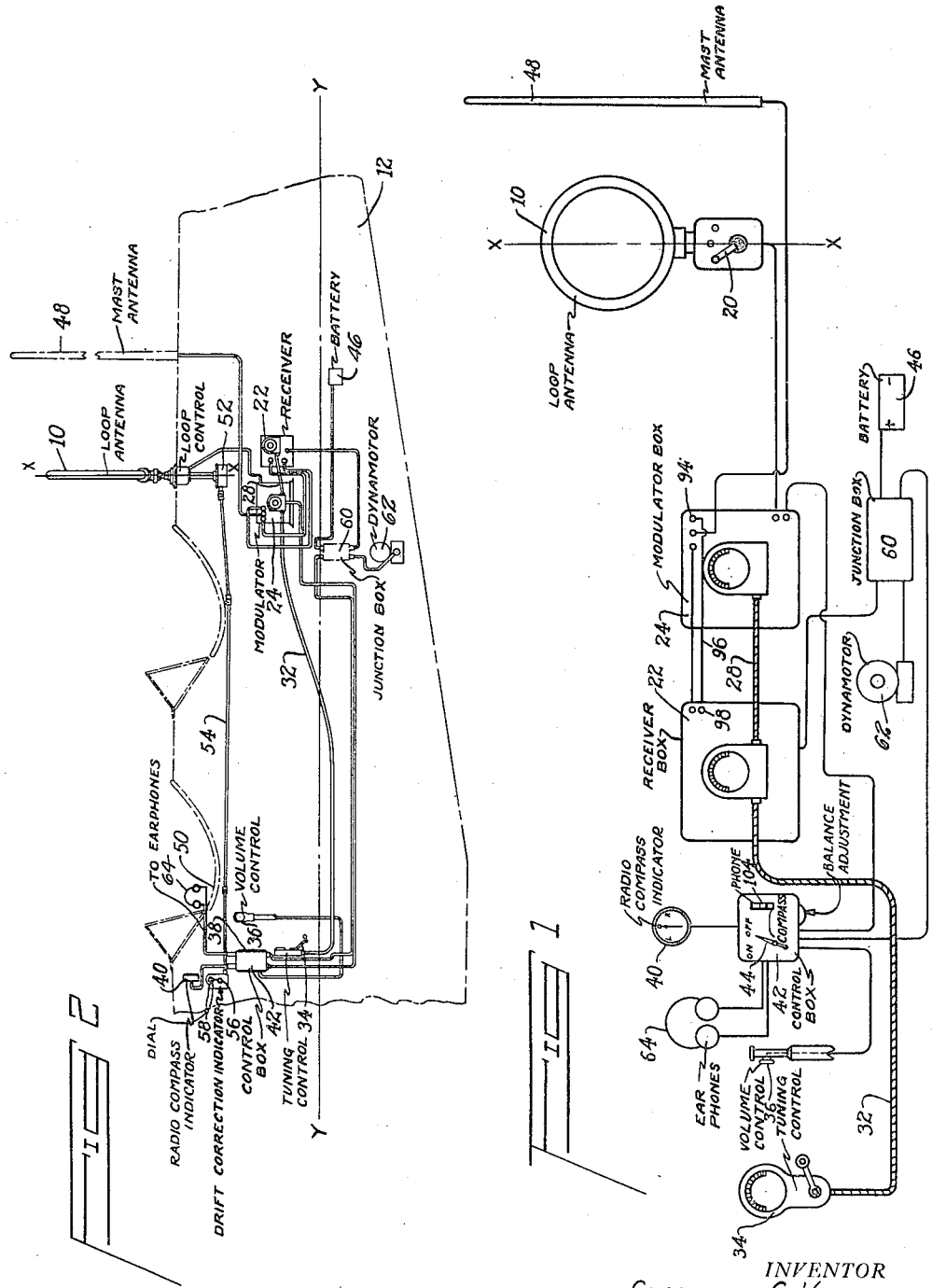

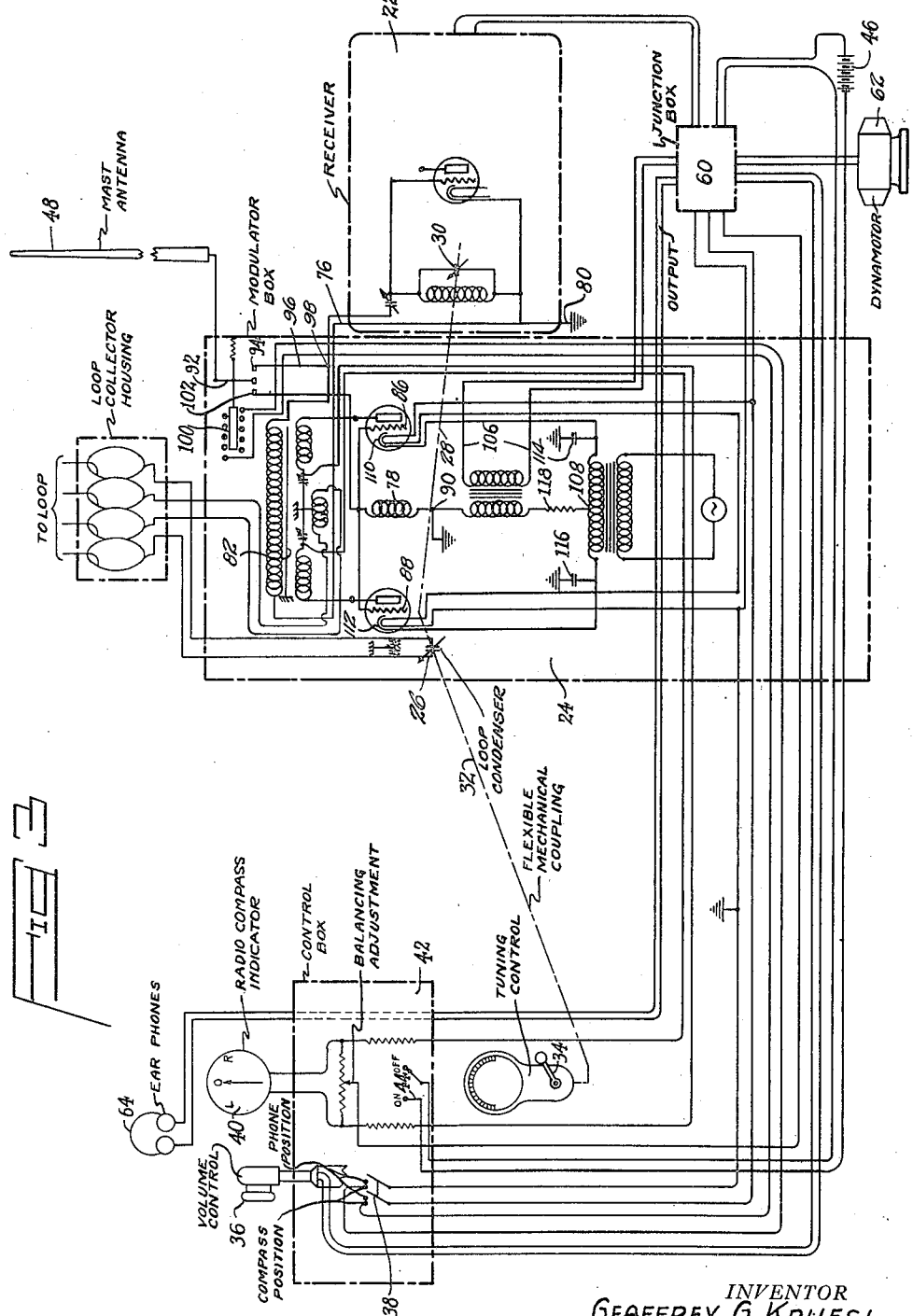

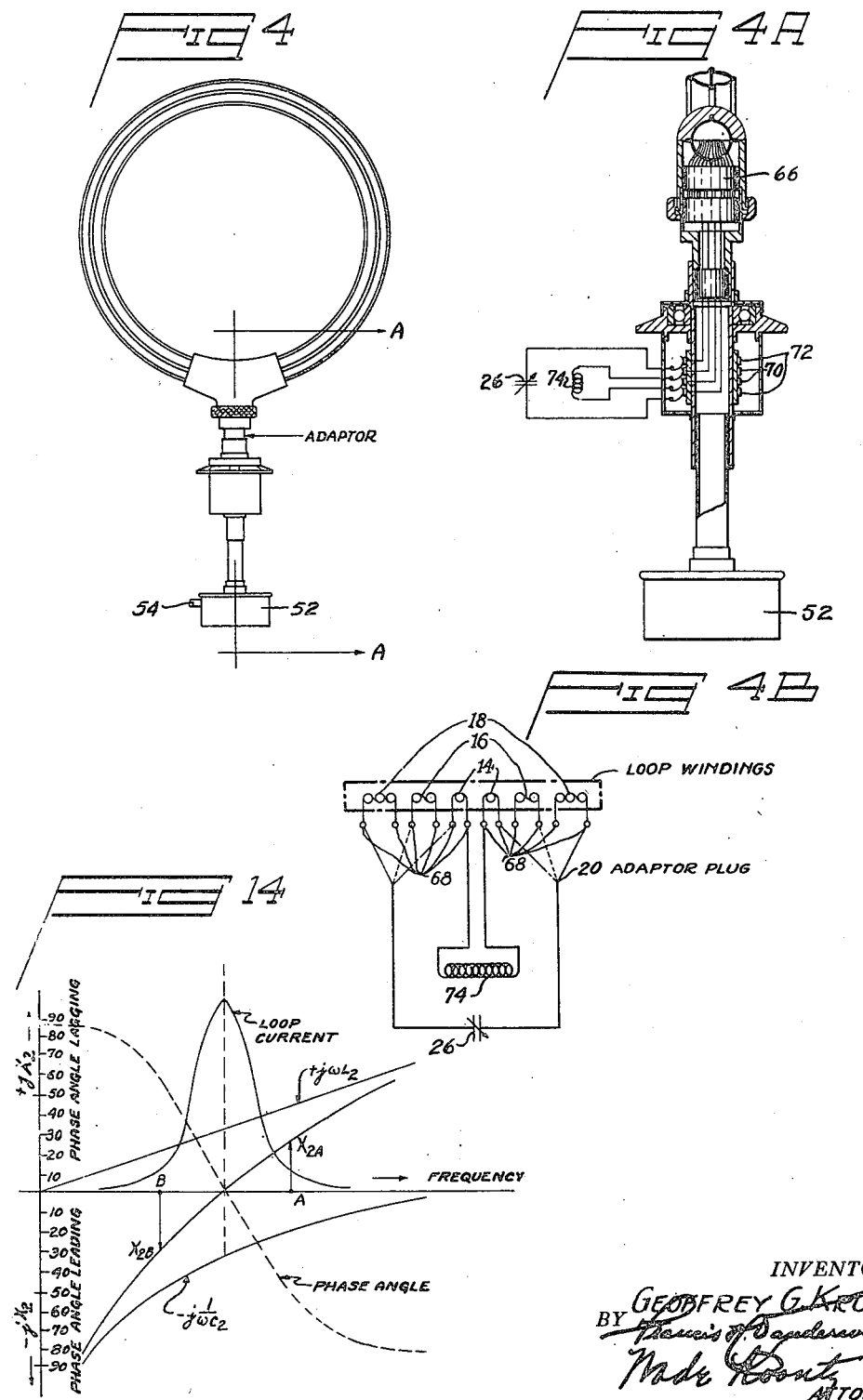

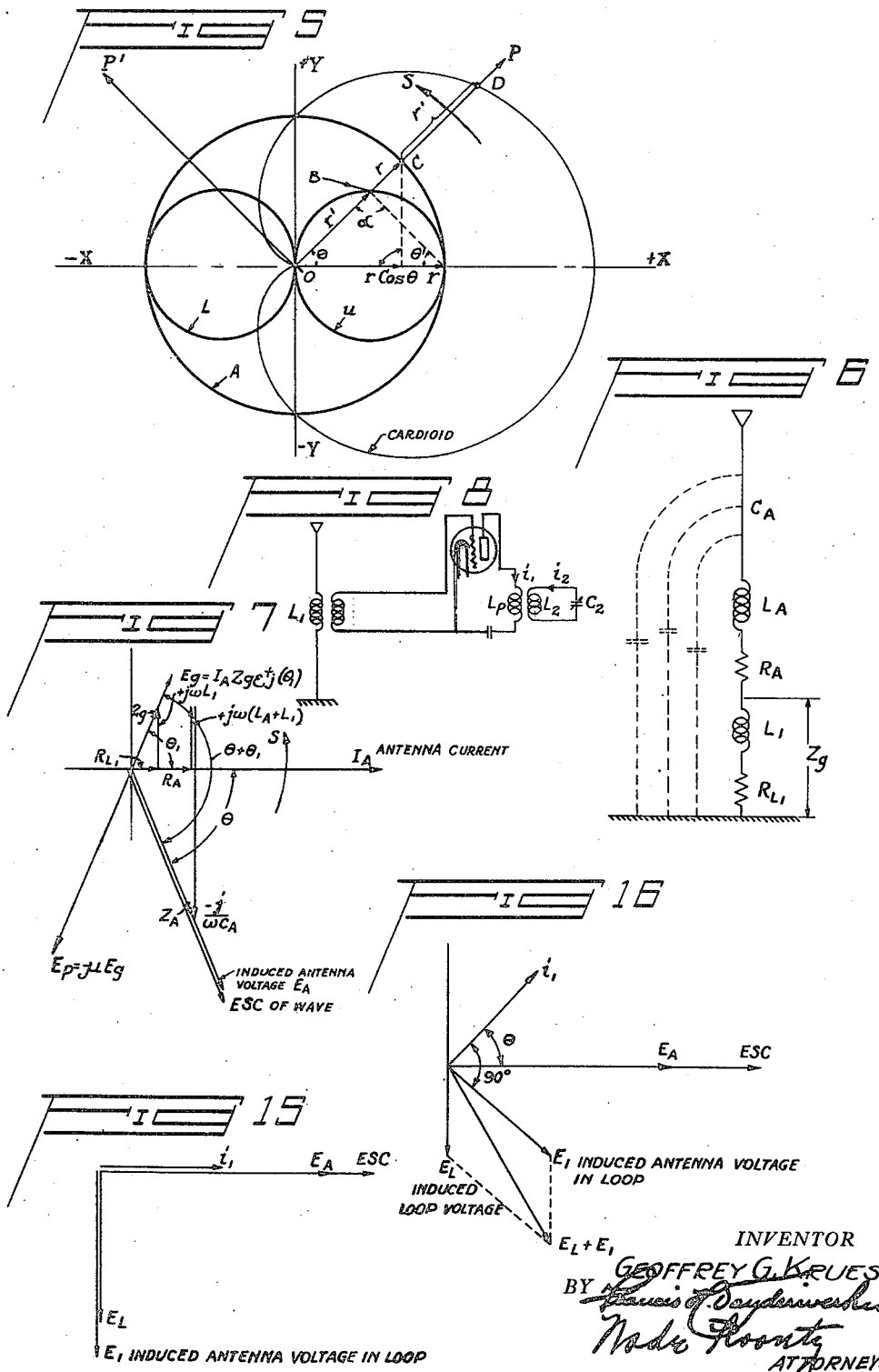

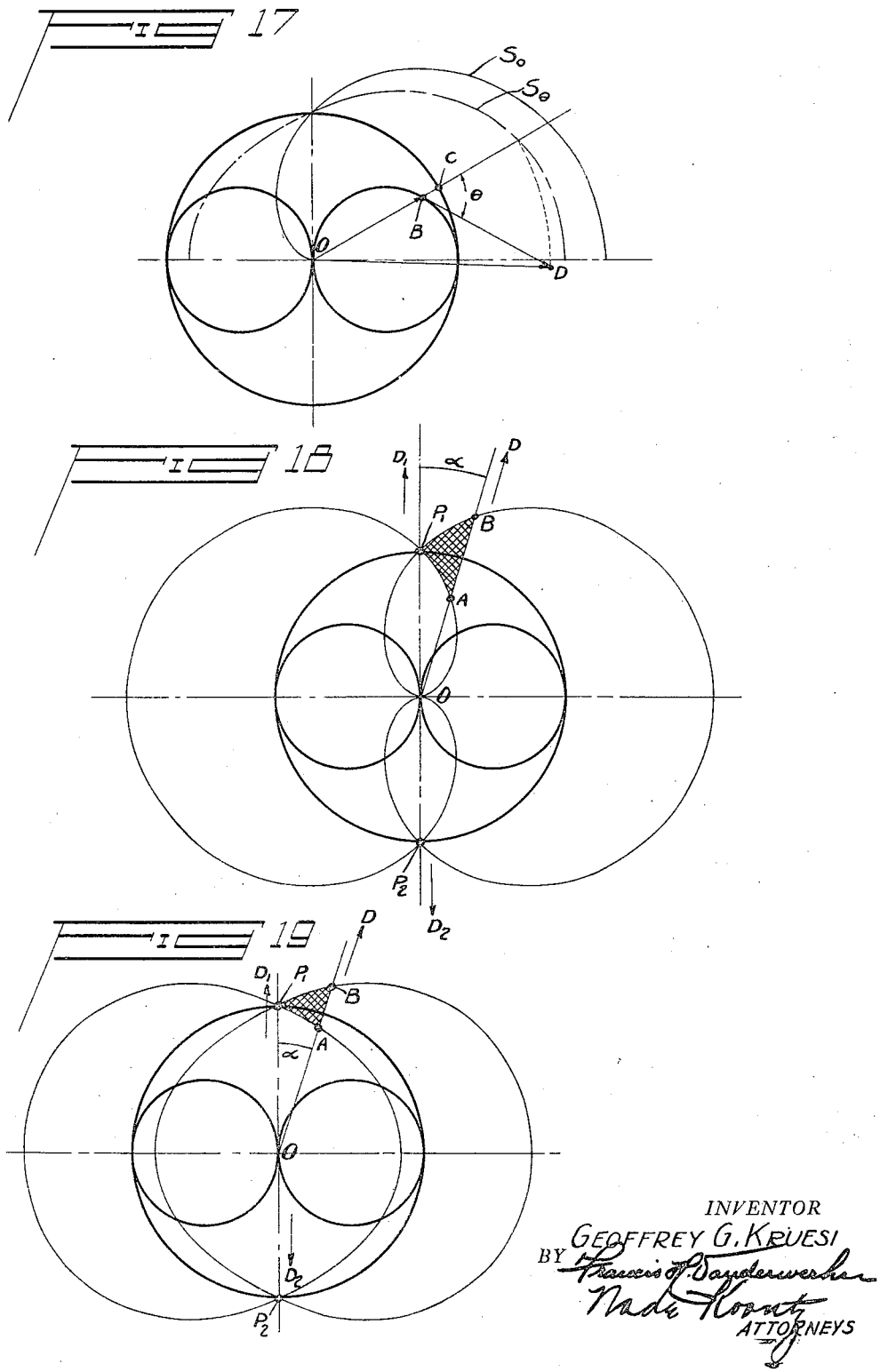

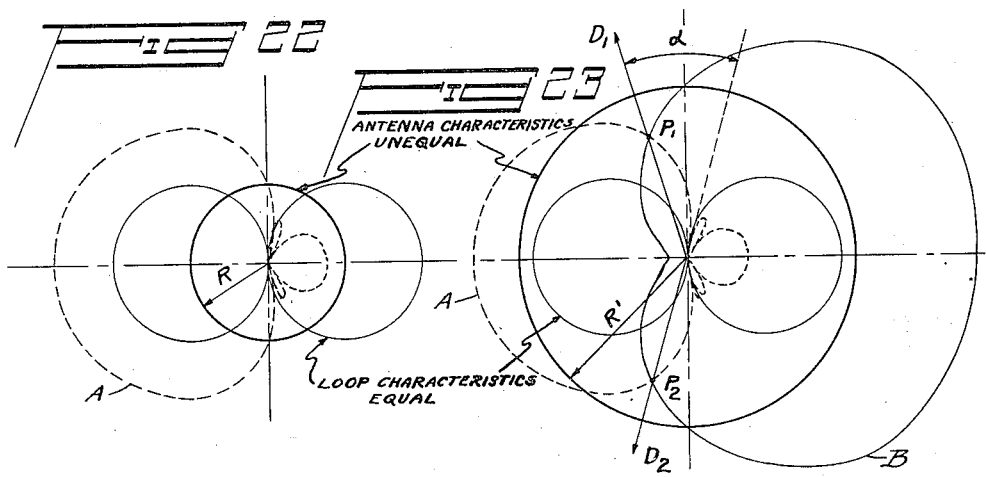
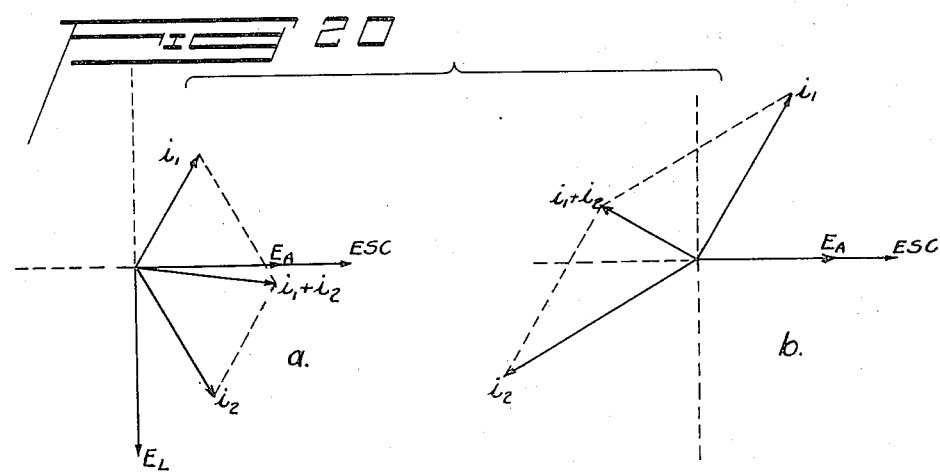
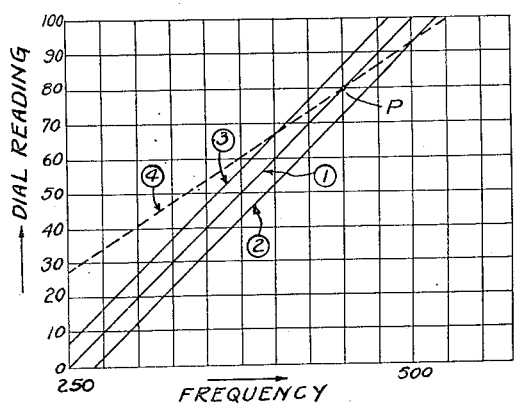

Patented Jan. 3, 1939

2,142,133

UNITED STATES PATENT OFFICE 2,142,133

RADIO DIRECTION FINDER

Geoffrey G. Kruesi, Dayton, Ohio

Application November 25, 1933, Serial No. 699,719

25 Claims. (Cl. 250—11)

(Granted under the act of March 3, 1883, as amended April 30, 1928; 370 O. G. 757)

The invention described herein may be manufactured and used by or for the Government for governmental purposes, without the payment to me of any royalty thereon.

My invention relates in general to radio direction finders and radio compasses, and more particularly to improvements in radio direction finders of the type that employ the combined effects of a loop and antenna.

In the use of radio direction finders or radio compasses employing a loop and an antenna for obtaining directional characteristics, either unilateral or bi-lateral, the effects of the loop and the antenna are combined to produce a cardioid which, for the uni-lateral types is caused to rotate, and for the bi-lateral types is caused to reverse its polarity alternatively. Various methods have heretofore been disclosed for causing the cardioid produced in the uni-lateral type of radio direction finder to rotate and to alternatively reverse its polarity in the bi-lateral type.

One manner of alternatively reversing the polarity of the cardioid is disclosed in my application for United States Letters Patent, Serial No. 498,060, filed November 25, 1930, Patent No. 1,868,945. In accordance with this disclosure, a radio receiving system will receive radio frequency current on both an antenna and a loop, will modulate the antenna radio frequency current with a predetermined low frequency current, will combine the side bands of said modulated antenna current with the current received by the loop to obtain a directional cardioid characteristic which is caused to alternatively reverse its polarity by the use of a balanced modulator circuit. The combined effects of said radio frequency currents after being detected by the receiving system results in a new current of the same predetermined low frequency current, the amplitude and phase of which, however, is a function of the angular deviation of the loop with respect to the direction of the incoming signal. This detected current is then combined with the current of the original known frequency of constant phase and amplitude in a bridge circuit having a zero center galvonometer to give a visual right and left indication. Thus the direction of the loop relative to a straight line between the receiving apparatus and the transmitting station is determined.

It is well known that for compasses of this character employing the combined loop and antenna effects maximum sensitivity and maximum range of reception is obtained when the directional properties of the combined loop and antenna effects give a true cardioid characteristic. In order to obtain a true cardioid, it is essential, (1), that the antenna be tuned to resonance so as to carry current in phase with the induced antenna voltage (E. M. F.) and have a suitable amplitude; (2), that the loop be tuned to resonance so that the loop current will be in phase with the induced voltage (E. M. F.) in the loop, and that the maximum amplitude of the loop be equal to that of the antenna; and that (3), the tuned antenna and loop circuits be inductively coupled in such a manner that the resulting currents of the antenna and loop present in the loop circuit are in phase with respect to one another.

When radio devices of this character are used in airplanes or other small craft, it is found impracticable to employ sufficiently large antennae to obtain resonance so that with the use of smaller antennae the circuit is highly capacitatively reactive and the antenna current will be considerably leading with respect to the induced antenna voltage (E. M. F.). Obviously, if the antenna current is leading by an angle dependent upon the electrical constants of the antenna, said antenna current being induced through direct or inductive coupling in the loop circuit, the same leading angle or phase difference as originally existing in the antenna will exist between the loop current and antenna current induced in the loop, irrespective of the frequency to which the loop is tuned. It can be shown mathematically, and it has actually been proved by experiment, that the sensitivity and range of reception are reduced below maximum for any such phase difference varying between zero and 180° and that if this phase difference is 90° sensitivity and range of reception are null.

In devices of this character where the effective height of the non-directional antenna is limited, the coupling between the loop and the receiver is exceedingly greater than the coupling between the antenna and receiver, the predominant portion of the total energy received from the antennae being introduced into the receiver by virtue of the loop circuit. One of the requirements for a true cardioid, that of equal loop and antenna current amplitudes in the receiver input circuit, is therefore not fulfilled. If, furthermore, the antenna to receiver coupling is smaller than the antenna to loop coupling, then the predominant portion of the non-directional antenna energy will flow to the receiver by virtue of antenna-loop coupling. This relationship will result in a greater portion of the antenna energy being non-phaseable with the loop energy. Thus, these currents are introduced into the receiver in out of phase relation with the result that the amplitudes of the cardioid thus produced are relatively small and the cardioid, because of this out of phase relation, is not true to form.

It is, therefore, an object of my invention to provide a novel radio circuit arrangement consisting of three circuits that are coupled in such a manner that a variation in the phase and amplitude of the current in one circuit can be effected without materially affecting the phase and amplitude of the current in a second circuit and at the same time produce a desired phase relationship between said two currents in a third circuit.

In order to approximate the true cardioid characteristic in radio direction finders or radio compasses employing this novel coupling arrangement between loop, antenna and receiver or collective circuit, compensating means may be provided in either or both the antenna and loop circuits and/or between them to vary the phase difference that inherently exists between the loop and antenna currents to the desired value.

One method of compensating for this phase difference between the antenna and loop circuits in a radio compass of this character consists in establishing a relationship between the respective coupling elements of the antenna, loop and receiver circuits in which the relative magnitude of coupling between the loop and antenna circuit and likewise between the loop and receiver circuits are small compared to the magnitude of coupling between the receiver and antenna circuits so that the phase and amplitude of the loop current can be varied with respect to the induced loop voltage substantially independently of the existing phase relation between current and voltage in the antenna circuit so as to bring the antenna and loop currents present in the input circuit of the receiver into phase or 180° out of phase with respect to each other. The desired correction of phase relation between the loop and antenna currents in the input circuit of the receiver may be brought about by making the loop circuit either inductively reactive or capacitively reactive to an extent depending upon the magnitude of the out of phase condition existing between the current and induced voltage in the antenna circuit.

Since the in phase condition and the 180° out of phase condition are equivalent respectively to the algebraic addition and algebraic subtraction of the loop and antenna currents, which it can be shown graphically will result in two cardioid figures having opposite sense of direction, it will be obvious that the adjustment rendering the loop circuit inductively reactive as against an adjustment rendering same capacitively reactive will result in a 180° ambiguity of directional bearings. Furthermore, since the loop circuit is to be adjusted for each particular frequency to which the receiver may be tuned, it thus becomes essential in order to prevent the occurrence of a 180° ambiguity, that the selected sense of adjustment must substantially remain the same over the entire range of frequencies for which the radio receiver is to be employed.

It is, therefore, a further object of my invention to provide in an apparatus of this character in which an untuned antenna circuit and a loop circuit having a predetermined reactance (either positive or negative) are electrically coupled to a receiver circuit, means for maintaining the selected adjustment of reactance of the loop circuit for any given frequency to which the loop and receiver circuits are adjusted.

In my above referred to patent the input audio frequency transformer was disclosed as being connected in series with the antenna circuit, and the antenna circuit being connected electrically to the input circuit of the receiver through the commutative means and subsequent inductive coupling to the loop circuit, it was found that a condition of regeneration was produced in the receiver at moderate volume settings and a condition of oscillation at high volume settings. These conditions of regeneration and oscillation cause undesirable phase changes between input and output circuits of the receiver, thereby causing deviations of bearing direction and in extreme cases complete reversal of direction indication. In accordance with my novel improvements these disadvantages were overcome by isolating the antenna circuit proper from the audio frequency circuit of the modulating means and also by isolating the input circuit of the radio receiver from the loop circuit to such a degree (small coupling coefficient) that the amount of regeneration is kept at a minimum for all practical volume control settings.

The isolation of antenna circuit in a circuit system of the type such as disclosed in my above referred to patent may be accomplished by either by-passing the audio frequency input transformer allowing the radio frequency current to flow without restriction and assuring a direct capacitive radio frequency path to the cathodes of the modulator tubes or by placing the ground connection of the antenna circuit ahead of the audio frequency input transformer and modulator and again assuring a direct capacitive radio frequency path to the cathodes of the modulator tubes.

The degree of coupling between the input circuit of the receiver and loop circuit is adjusted so that the degree of regeneration is reduced to a minimum by inductively coupling the receiver input circuit to the loop circuit and at the same time overcoming the effects of the unbalanced loop circuit that is otherwise obtained by the direct connection between loop and receiver circuits as in the disclosure in my above referred to patent.

Since in radio directional compasses of the bilateral type the direction of the incoming signal is determined with reference to two null points that are obtained upon reversal of the cardioid, it becomes essential that these two null points be practically exactly 180° apart. This condition requires that not only must the phase difference of the loop and antenna currents be either more or less than 90° apart but also the respective amplitudes of the combined currents upon reversal must be the same for directions of the incoming signal having deviations that are equal to either side of the normal of the plane of the loop.

It has already been noted that a reversal of cardioid characteristics is obtained by a relative change of the polarity between loop and antenna currents. This had heretofore been accomplished by various commutative means either mechanical or electrical.

It is found that true reversals of cardioid characteristic was not heretofore obtainable by reason of the fact that the commutation means was not so constructed as to be capable of rendering the amplitudes of the particular antenna current with which it was associated the same during consecutive half cycles of commutation.

It has been discovered and proved by experiment that when electrical commutative means employing two tubes operating alternatively at maximum and minimum amplification that the amplitudes of the particular antenna current with which the electrical commutative means is associated is not the same upon reversal of its polarity due to the inherent differences in the characteristics of the tubes as for instance, mutual conductance, amplification factor and interelectrode capacity values.

It is, therefore, a further object of my invention to provide broadly means for adjusting a commutative device whereby the respective alternating current (A. C.) components of the antenna or equivalent generating source with which the commutative device is associated are made to have desired values during successive half cycles of commutation.

This adjustment may be accomplished by providing, in a balanced modulator circuit that is associated with an antenna means, a capacitive or inductive reactance or reactances in one or the other or both of the plate circuits of the two tubes, the reactance being of sufficient magnitude so as to be capable of controlling the radio frequency current flow of the one plate circuit relative to that of the other plate circuit or by a different method which consists in associating an adjustable circuit with one or the other or both of the plate circuits to vary the coupling coefficients between said circuit and each of the plate circuits of the balanced modulator circuit to desired values respectively.

Simplicity of operation is essential to the successful use of the instrument especially when used with other flying instruments such as during instrument flying or where a single pilot is required to perform the flying and navigation operations. To this end the pilot ought to be able definitely to determine with a minimum loss of time the identification of the desired broadcasting station by oral reception and immediately thereafter by the use of a single means to obtain his relative heading with respect to said station.

In accordance with my above referred to patented disclosure, the system therein, due to the fact that the antenna circuit is connected to the modulator circuit, the effect of the modulation makes itself present in the output of the receiver, thereby rendering the receiver impractical for the intelligent reception of a voice modulated carrier wave. This condition is further augmented by the fact that the loop circuit being unbalanced with respect to ground because of its direct connection to the receiver, causes the modulation effect of the modulator circuit to be carried through the receiver (by induction) even though the antenna would be disconnected from the modulator circuit for aural reception.

It is, therefore, a further object of this invention to provide in a circuit system of this character a novel switching arrangement between the antenna and the receiver and between the antenna and modulator circuit to prevent energy from the modulator to be carried through the receiver when the antenna is disconnected from the modulator circuit and connected to the receiver for purposes of aural reception.

For an illustration of the manner of practicing my invention, reference is to be had to the accompanying drawings, in which:

Fig. 1 shows a diagrammatic view of the entire apparatus used in the practice of my invention.

Fig. 2 shows the same as applied in an airplane installation.

Fig. 3 shows a complete wiring diagram of the apparatus as employed in said shown airplane installation.

Fig. 4 is an elevational assembled view of the loop antenna.

Fig. 4A is a sectional view taken on the line A—A of Fig. 4.

Fig. 4B is a schematic wiring diagram of the loop circuits.

Figs. 5, 7, 9, 11, 15 to 20, 22 and 23 inclusive, show vector diagrams and field strength patterns of directional character which embody the general scheme of my invention.

Fig. 6 shows diagrammatically an open antenna circuit.

Fig. 8 shows diagrammatically an untuned open antenna coupled to a tunable loop circuit through a vacuum tube circuit.

Fig. 8A is a view similar to Fig. 8, showing in addition a receiver circuit coupled at its input to the loop circuit.

Fig. 10 is an electrical equivalent circuit of the circuit shown in Fig. 8.

Fig. 12 is a detail diagrammatic view showing the manner of coupling the loop, modulator and receiver circuits, as shown in Fig. 3.

Fig. 13 shows an electrical equivalent circuit of Fig. 12.

Fig. 14 is a reactance diagram of the loop circuit.

Fig. 21 is a graph showing relationship between the receiver circuit and the loop over a given frequency range.

Referring to Fig. 1, the numeral 10 indicates a loop antenna of a diameter of about 20" and capable of either being turned about a vertical axis X—X, or else retain a fixed position of the plane of the loop with respect to the longitudinal axis Y—Y of the moving craft, such as airplane 12, partially shown in phantom. The loop is formed of a plurality of symmetrically arranged loop sections and as illustrated herein, comprises three sections 14, 16 and 18 (see Fig. 4B) that are connected together in such a manner so that one or more of said sections may be employed at the same time depending upon the frequency range desired. The numeral 20 designates a three-way switch whereby certain of said sections of the loop windings may be employed such as to render the apparatus capable of receiving radio frequency energy over a number of frequency bands to which the receiver may be adjusted. The numeral 22 indicates a standard aircraft receiver having three frequency ranges depending on the type of plug in coil (not shown) which is being used. Numeral 24 designates the modulator unit containing a variable condenser 26 for adjusting the loop reactance, which condenser, by means of a mechanical flexible coupling link 28, may be brought into a fixed relationship with the condenser 30 of the receiver 22 so that through the flexible tuning control cable 32 the modulator and receiver may be controlled by a single tuning control 34. Numeral 36 designates a volume control knob mounted on the control stick of the airplane. Numeral 38 designates a toggle switch which, as may be seen, has an "up" or "phone" position and a "down" or "compass" position. Numeral 40 is a conventional zero center galvanometer with "left", "0" and "right" course dial markings. Numeral 42 designates the control box containing balancing means for adjusting the plate current potential of the bridge circuit that includes the galvanometer control switch 44 to turn on the source of electric energy, or to shut same off, the battery 46, and control means, that is, the toggle switch 38, to either use the equipment for aural reception of radio energy or else to convert the apparatus into an automatic visual direction finder or homing device. Numeral 48 designates a non-directional antenna which may be either of the vertical mast type or single wire type, fixed or trailing aboard the airplane.

Referring to Fig. 2, a typical installation on an airplane is shown giving the general dispositioning of the various units as mentioned.

It will be seen that the control box, volume control, tuning control, loop deviation indicator together with the radio compass indicator are all conveniently mounted in the pilot's compartment 50, thereby enabling the pilot to operate the equipment, be it used for aural reception or directional flights, entirely remote from the location of the receiving equipment proper. In addition, there is shown a gear box 52 which allows the pilot to turn the loop by means of the flexible shaft coupling 54 and crank 56. Numeral 58 designates an indicator dial showing the amount of angle by which the loop is turned out to the normal position of the plane of loop which is at right angles to the longitudinal axis of the airplane. Numeral 60 designates a junction box and 62 designates a dynamotor for supplying the tubes of the receiver and modulator with the necessary power. Earphones 64 are connected to the receiver through the receiver junction box. The terminals of all the windings of the three sections 14, 16 and 18 of the loop may be connected either to a female receptacle plug 66 as shown in Fig. 4A or to the contact points 68 of the selective switch 20 shown diagrammatically in Fig. 4B. Three adapter plugs, one of which is shown, are provided. The adapter plugs are provided with such internal connections so that one or more of said loop sections may be connected in series, the particular plug that is used depending upon the frequency range desired. The terminal outlets of the plug that is used are connected to four collector rings 70, 72 that are parallelly disposed one above the other and concentric with the axis of rotation of the loop. Rings 70 are connected to the loop coupling coil 74 which is symmetrically placed at the electrical center of the loop sections 14, 16 and 18, the other two rings 72 being connected to the terminals of the variable condenser 26 of the loop circuit. The use of the three way switch 20 will, of course, eliminate the necessity for the separate adapter plugs.

Referring to Fig. 3, the wiring diagram shown is in general a diagrammatic view showing simultaneously the disposition of the component parts of the equipment and their connections. The wiring diagram shown in Fig. 3 is somewhat similar to my above referred to U. S. Letters Patent, and includes certain distinct and novel features that are applicable to various radio compasses of this character and, which in practice, are of utmost importance to render devices of this character more reliable and more efficient.

As heretofore described, the range of wave length can be increased by adding the turns of one section of the loop to the turns of another loop section or sections by means of the separate adapter plugs or by the three-way switch.

Referring now to Figs. 3 and 12, the loop or directional antenna is commonly coupled to the input circuit 76 of the receiver and to the antenna modulator circuit 78 by inductive coupling. The number of turns of the coupling coil $L_L$ of the loop and the relative position of this coil with respect to the coupling coils $L_{P1}$ and $L_{P2}$ of the antenna circuit and the coupling coil $L_R$ connected to the input of the receiver are such as to effect a weak coupling coefficient between the loop circuit to the antenna circuit and the loop circuit to the input circuit of the receiver, respectively.

The coupling coil $L_R$ is so positioned with respect to the antenna coils $L_{P_1}$ and $L_{P_2}$ and the number of turns of the coil $L_R$ are such as to effect a strong coupling coefficient between the antenna and receiver circuits. It will thus be obvious that the antenna current will be split up so that a preponderance of the antenna current will be present by inductive coupling in the receiver circuit and only a small portion of the antenna current will be present in the loop circuit. Furthermore, the receiver circuit will constitute a collective circuit wherein the major portion of the antenna current will combine with the separately induced loop current and so much of the antenna current as is induced in the loop circuit. Since the coupling coefficient between the loop and antenna circuits is relatively small, variations in the reactance of either circuit will have little effect upon the other circuit. Consequently, it is possible with this arrangement to obtain a relative change in phase between the loop currents (that is, the antenna current portion induced in the loop and generated loop current) and the major portion of the generated antenna current, by adjusting the reactance of the one circuit with respect to the other.

In the particular circuit system disclosed herein by way of illustration the receiver coil $L_R$ is grounded at one end 80 (filament end). It will thus be apparent that the capacity between the coil $L_{P_1}$ and coil $L_R$ and the capacity between coils $L_{P_2}$ and $L_R$ will be unequal. The effective coupling, therefore, between the respective sets of coils will result in a greater transfer of energy in one set as against the other. For this reason unequal cardioid patterns will be produced during successive half cycles.

To eliminate the error which would otherwise result in the reading of the reciprocal bearing as would be indicated by the needle of the microammeter 40 a static shield 82 is interposed between coil $L_R$ and coils $L_{P_1}$ and $L_{P_2}$. The static shield, being grounded at one end 84 will assure by virtue of the established capacity balance between the coil sets a balanced transfer of energy from the non-directional antenna circuit to the receiver circuit during successive half cycles of operation of the balanced modulator circuit.

The precautionary measure is not necessary where initially balanced receiver input circuits are employed.

If, instead of commutating the non-directional antenna the loop were commutated, a similar static shield would have to be interposed between receiver coil $L_R$ and loop modulator coils even though the loop itself were initially (capacitively) balanced.

As illustrated herein, the reactance of the loop circuit is adjusted by the variable condenser 26. This reactance may be made capacitive or inductive depending upon whether the condenser knob is turned either to the left or right of the tuning position.

It is found by actual experiment that changing from one reactance to another will produce a reversal in the sense of bearing indication. It is, therefore, essential that the preselected sense of reactance be maintained over the entire range to which the receiver may be tuned. In Fig. 21 the lines 1, 2 and 3 are the respective curves of the frequency characteristics of the receiver and loop circuits. These curves, it will be noted, have the same slope and are parallel so that reversal in bearing indication which would otherwise take place if these curves were to intersect each other within the frequency range as indicated by dotted line 4 is prevented. To this end the variable condenser of the loop is so designed that in connection with its associated loop it will produce, when adjusted to a preselected reactance, a frequency characteristic corresponding to that of the receiver frequency characteristic. This relationship is maintained by the use, as heretofore stated, of suitable mechanical means such as a flexible shaft connection 28, 32 and remotely controlled tuning control crank that simultaneously actuate both the variable condenser and tuning condenser.

The antenna aerial itself may be either a simple wire that is short in length or as illustrated, is a short mast 48 for which a connection terminal is arranged at the top of the modulator unit 24. The aerial has its ground wire connected to a terminal connection which, in turn, is connected to the terminal connection for the ground wire of the receiver. The coil 78, Fig. 3, of the antenna circuit is interposed between the grids 86 and 88 of the two amplifying tubes of the balanced modulator circuit and the ground point connection 90.

The antenna mast or non-directional antenna may be connected to the receiver directly to aurally identify the station to which the receiver may be tuned or it may be indirectly connected through the modulator circuit to the receiver to visually indica e the sense of direction of the station to which the receiver may be tuned. This is accomplished as illustrated herein (Figs. 1 and 3) by a remotely controlled switch mechanism consisting of a solenoid operated contact arm 92 which normally is held in engagement with the contact 94 that is electrically connected by a level wire 96 to the terminal connection 98 of the receiver. This position of the contact arm is designated as the "phone" position. By energizing the solenoid 100 the contact arm is moved to contact 102 thereby connecting the antenna to the modulator circuit. This position is designated as the "compass" position. These designations "phone" and "compass" are present on the control box 42 which includes a toggle switch 104 for closing when in the "up" or "compass" position an electrical circuit that includes the solenoid 100 and a 12-volt battery 46.

Since, as illustrated, the loop circuit is balanced, it will not have an antenna effect and therefore when the mast antenna is removed from the modulator circuit and connected to the receiver circuit for aural reception, there will be no side bands produced in the modulator circuit and even though the receiver circuit is inductively connected to the loop and modulator circuits, there will be no undesirable modulation effects present in the output of the receiver.

The arrangement of the balanced modulator with respect to the receiver is similar to my above referred to patent disclosure in that it serves not only as a balanced modulator for the system but also acts as a detector for the low frequency currents desired to be added together to give the desired indications.

However, in accordance with my present disclosure, the low frequency transformer that connects the output of the receiver with the modulator circuit is isolated from the antenna input circuit or coil by interposing the secondary winding of the low frequency transformer 106 between ground and the electrical mid-point 108 of the two cathodes 110 and 112 of the two tubes with the result that the small capacities 114 and 116 are connected across the transformer and resistance. Thus, this arrangement not only assures an unimpeded radio frequency current flow from the antenna mast to the cathodes of tubes but also assures that the low frequency current will flow to the input of the receiver through resistance 118 and a very small interelectrode capacity (plate to cathode) and antenna-receiver coupling, thereby rendering the coupling coefficient between the input and output circuits of the receiver small.

Theory of the invention

It has long been known that, considered from a purely geometrical standpoint, a cardioid figure may be obtained by superimposing upon a circle a figure 8 is shown in Fig. 5. It must be assumed, however, that one half of the figure 8 is to be added to the circle whereas the other half must be subtracted from the circle.

Analytically this can be expressed with the following relation:

The vector $r'$ as it is being rotated in the indicated sense S and if made to vary its amplitude so that its end point moves on the figure 8 is:

$$r' = r \cos \theta$$

since angle $\alpha$ is at all times 90°. Cos $\theta$, however, becomes negative when directions to the left of the Y axis are considered so that the sense of vectors being to the right of the plus or minus Y axis must be taken as positive and all other values as negative. In order to make the addition of O—B with O—C, it is implicitly assumed that the sum of O—B and O—C must lie in direction O—P, the sum, of course, is to be taken vectorially which in the case of a true cardioid will be taken in direction O—P.

Let us assume that the vectors O—B and O—C represent the relative field strengths of a loop antenna and a non-directional antenna, the directional characteristic of the loop being represented by figure 8 L and that of the non-directional antenna by circle A.

Obviously if we are to arrive at the sum at a point D on the cardioid, we have added the value for the two field strength components both in the same direction which means that they are to be considered as being timely in phase. Also, in order to make the sum zero in the minus X direction, the condition exists that their respective amplitudes must be equal and opposite in that direction. Whereas this result may readily be obtained by tuning the antenna circuit to resonance and coupling same inductively to a loop circuit, also tuned to resonance, it is found in radio compasses of this kind that the antenna circuit is generally untuned due to same being used on comparatively small craft and necessitating antennae of small physical dimensions.

Let us consider for instance an antenna circuit as shown in Fig. 6. It is assumed that $C_A$, i. e., the electrostatic capacity be very small on account of small physical length. The summation of all reactances and resistances gives:

Total impedance $Z_A = R_{IA} + R_A + j\omega(L_A + L_1) + \dfrac{-j}{\omega C_A}$ If $$\dfrac{1}{j\omega C_A}$$

is large, due to $C_A$ being small, this equation may conveniently be represented by the following vector diagram (Fig. 7). In order to obtain from said impedance vector relation that of the current vector relation it is readily seen that the induced antenna voltage $E_A$ must lie in the direction of $Z_A$ and the current in the direction of the resistive components. Hence, the current with respect to voltage is leading by the argument $+\theta$ or analytically, as expressed:

$$\text{antenna current } I_A = \frac{E_A \epsilon^{+j\theta}}{Z_A}$$

Of the entire voltage $E_A$, only a portion is applied to the grids of the balanced modulator circuit (see Fig. 3), namely, that which lies between the common grid and ground connection.

Fig. 7 shows said voltage to be:

$$+E_g = I_A Z_g \epsilon^{+j(\theta_1)}$$

The voltage $+E_g$ supplied to the common grid connection is, therefore, leading with respect to the antenna current $I_A$.

Referring now to Figs. 8 and 8a, it will be seen that the grid voltage is appearing in the plate circuit but of opposite phase and amplified $\mu$ times; hence:

$$E_p = -\mu E_g$$

and this voltage will be causing a current to flow through the internal tube resistance and an external load circuit, the nature of the latter depending upon the coupling coefficient between the respective plate and loop circuits and the electrical constants of the loop circuit. Analytically expressed:

$$I_p = \frac{\mu E_g}{R_1 + Z_0}$$

Where $Z_0$ = external impedance in the plate circuit. In order to study the effect of a variation of $Z_0$, I shall now refer to the theory of coupled circuits. Fig. 8 shows an antenna circuit, a modulator circuit inductively coupled to a loop circuit $L_2C_2$.

Let us consider for a moment that there is a leading phase angle $\theta$ between induced antenna voltage $E_A$ and antenna current $I_A$ (Fig. 7). This phase angle depends primarily upon the electrical constants of the antenna circuit, but is as it appears in the plate circuit additionally influenced by the constants of the loop circuit which is coupled to the plate circuit.

The extent to which the electrical constants of the loop circuit affect the phase relationship between induced antenna voltage and antenna current appearing in the plate circuit is best understood by a general mathematical analysis. The equivalent electrical circuit and vector diagrams respectively of Figs. 8 and 8A are given in Figs. 9 and 10; the relations existing between the A. C. components of plate voltages and currents can be shown to be as follows:

For Fig. 10:

$R_i$ = Internal resistance of tube.
$r_1, L_{11}$ = Resistance and inductance of plate circuit coupling inductance.
$r_2, L_{22}$ = Resistance and inductance of loop coupling coil.
$R_L$ = Effective loop resistance.
$L_2$ = Inductance of loop.
$C_2$ = Capacity of loop tuning condenser.
$L_{12} = M$ = Mutual inductance between loop circuit and antenna circuit.
$i_1$ = Effective A. C. current component flowing in plate circuit.
$i_2$ = Effective A. C. current component flowing in loop circuit.

It is further defined:

$\omega = 2\pi f$, where $f$ = frequency of received wave
$\omega L_{11} = x_{11}$ = Reactance of plate circuit coupling coil
$Z_{12} = \omega L_{12}$ = Mutual reactance between plate circuit and loop circuit and $$L_2' = L_2 - \frac{1}{\omega^2 C_2}$$

$$X_2 = \omega(L_2' + L_{22})$$

$$X_1 = x_{11} - X_2 K^2$$

$$K^2 = \frac{Z_{12}^2}{R_2'^2 + X_2^2}$$

$$R_2' = r_2 + R_L$$

$$R_1 = r_1 + R_i$$

$$\rho_1 = r_1 + R_i + R_2' \frac{Z_{12}^2}{R_2'^2 + X_2^2} = (r_1 + R_i) + R_2' K^2$$

An examination of vector diagram shown in Fig. 9 shows that:

$$E_p = -\mu E_g = i_1 \left[ \left( R_i + r_1 + R_2' \frac{Z_{12}^2}{R_2'^2 + X_2^2} \right) + j \left( x_{11} + X_2 \frac{Z_{12}^2}{R_2'^2 + X_2^2} \right) \right]$$

where for practical purposes: $r_1$, $r_2$, $L_{22}$, $L_{11}$ can be neglected. The above equation, under these assumptions will take on the form:

$$E_p = -\mu E_g = i_1 \left[ R_1 + R_2 \frac{Z_{12}^2}{R_2^2 + \left(\omega L_2 - \frac{1}{\omega C_2}\right)^2} + j\left(\omega L_2 - \frac{1}{\omega C_2}\right) \frac{Z_{12}^2}{R_2^2 + \left(\omega L_2 - \frac{1}{\omega C_2}\right)^2} \right]$$

If $Z_{12} = 0$; i. e., no coupling exists between the antenna plate circuit and the loop circuit, the above expression becomes of the form:

$$E_p = -\mu E_g = i_1 \cdot R_i$$

The already existing phase relation between $E_p$ and $I_A$ is therefore in no way disturbed.

If we couple the two circuits and bring the loop circuit into resonance, then $$\omega L_2 = \frac{1}{\omega C_2} \text{ hence } \omega L_2 - \frac{1}{\omega C_2} = 0$$

and for $Z_{12} > 0$ $$E_p = -\mu E_g = i_1 \left[ \left( R_1 + \frac{Z_{12}^2}{R_2} \right) + j(0) \right]$$

Again the existing phase relation is undisturbed. At the same time $$R_2 \frac{Z_{12}^2}{R_2^2 + (X_2)^2}$$

is at a maximum value. Again neglecting $r_1$, $r_2$, $L_{11}$ and $L_{22}$, the induced antenna current in the loop can be expressed:

$$i_2 = -i_1 \frac{Z_{12} X_2}{R_2^2 + X_2^2} - jR_2 \frac{Z_{12}}{R_2^2 + X_2^2}$$

and for $X_2 = 0$ (loop tuned to resonance)

$$i_2 = -i_1 \cdot j \frac{Z_{12}}{R_2} \text{ and } \frac{i_2}{i_1} = -j \frac{Z_{12}}{R_2} = -j \frac{\omega L_{12}}{R_2}$$

$i_1$ and $i_2$ are therefore in quadrature and their ratio is directly proportional to the coupling coefficient.

The manner in which variations of the loop reactance and/or coupling coefficient affect the phase relations between A. C. component of the plate current and plate voltage is best understood by proceeding as follows:

Since $$E_p = -\mu E_g = i_1\left[\left(R_1 + R_2'\frac{Z_{12}^2}{R_2'^2 + X_2^2}\right) + j\left(x_{11} - X_2\frac{Z_{12}}{R_2'^2 + X_2^2}\right)\right]$$

and $$\rho_1 = R_1 + R_2'\frac{Z_{12}^2}{R_2'^2 + X_2^2}$$

$$X_1 = x_{11} - X_2\frac{Z_{12}}{R_2'^2 + X_2^2}$$

It can be shown that a relation exists between $\rho_1$ and $X_1$ as follows:

$$(\rho_1 - R_1)^2 + \left[X_1 - \left(x_{11} - \frac{Z_{12}^2}{2X_2}\right)\right]^2 = \frac{Z_{12}^4}{4X_2^2} = R^2$$

This, however, is the equation of a circle, namely, $$(\rho_1 - \alpha)^2 + (X_1 - \beta)^2 = R^2, \text{ where}$$

$$\alpha = R_1, \ \beta = x_{11} - \frac{Z_{12}^2}{2X_2}$$

$$\text{and } R = \frac{Z_{12}^2}{2X_2}$$

Graphically this renders a reactance circle diagram as shown in Fig. 11.

The end point of the impedance vector $Z_1$ moves upon a circle of diameter $R$ with locus fixed by the expression $\alpha$ and $\beta$ provided that for a given frequency of the reactance of the loop circuit $X_2$ is varied by, for instance, varying the magnitude of capacity $C_2$.

The maximum phase angle obtainable is $\theta_2$; the minimum one $\theta_1$, the total possible variation is $\theta_2 - \theta_1$; the amplitude maximum is $Z''$, its minimum $Z'$.

It is evident that the larger $R$, the greater the phase variation $\theta_2 - \theta_1$ as $C_2$ is varied, meaning that the larger $$\frac{Z_{12}^2}{2X_2}$$

the correspondingly greater the reaction of the loop circuit upon the antenna circuit, a result which is obvious. Quantitatively it can be seen that said reaction depends not only upon $Z_{12} = \omega L_{12}$, i. e., the mutual reactance, but also upon $X_2$, although to a lesser extent than $Z_{12}$.

Since $$X_2 = \omega\left(L_2 - \frac{1}{\omega^2 C_2} + L_{22}\right)$$

it follows that said reaction between the two circuits is the smaller, the larger $L_2$ and $L_{22}$ as compared with $L_{12}$ or $M$, a result which is likewise obvious.

In order to make said antenna and loop circuits substantially independent or practically isolated from each other their coupling coefficient must essentially be small. In other words, for a given frequency any variation of $X_2$ should have a negligible or very small effect upon the already existing phase relation between antenna voltage and current in the plate circuit. Considering, however, that the loop circuit may be regarded as a generating circuit and that it is desired to combine said generated loop current with the antenna current in the plate circuit, it follows that a variation of $X_2$ for a given frequency will now make it possible to vary the phase relation of the generated loop current with respect to the generated loop E. M. F. without materially affecting the phase relation existing between voltage and current in the antenna or plate circuit. This will in turn make it possible to use a third circuit coupled respectively to both the antenna plate circuit and loop circuit as a collective circuit wherein by certain adjustments of $X_2$ the phase relation between the antenna plate current and generated loop current may be varied at will.

A coupling system comprising an antenna circuit, a loop circuit and collective circuit is shown in Fig. 12. The equivalent electrical circuit diagram of this coupling system is shown in Fig. 13.

In the Figures 12 and 13:

$X_A = 2\pi f L_A$ = Total reactance of antenna circuit
$X_L = 2\pi f L_L$ = Total reactance of loop circuit
$X_R = 2\pi f L_R$ = Total reactance of receiver circuit Referring now to Fig. 13, it is well known that the respective coupling coefficients between antenna-receiver circuit, receiver-loop circuit, loop-antenna circuit do not only depend upon the mutual reactances $M_1$, $M_2$ and $M_3$ between them respectively, but also upon the magnitude of the respectively associated circuit constants $L_A$, $L_L$ and $L_R$.

Since the coupling coefficient $K$ between any two circuits designated as A and B with their respective total circuit reactances, $X_a$ and $X_b$ is defined as $$K = \frac{\omega M}{\sqrt{(X_a + \omega M)(X_b + \omega M)}}$$

where:

$\omega M$ = Mutual reactance between the two circuits, it follows from Fig. 13 that we may now write the respective coupling coefficients above referred to as follows:

Antenna-receiver circuit coupling coefficient:

$$K_1 = \frac{\omega M_1}{\sqrt{(X_A + \omega M_1)(Y + \omega M_1)}}$$

wherein $$Y = X_R + \frac{[X_L + \omega M_3]\omega M_2}{X_L + \omega[M_2 + M_3]}$$

Receiver-loop circuit coupling coefficient:

$$K_2 = \frac{\omega M_2}{\sqrt{(X_R + \omega M_2)(Z + \omega M_2)}}$$

wherein:

$$Z = X_L + \frac{(X_A + \omega M_1)\omega M_3}{X_A + \omega(M_1 + M_3)}$$

Loop-antenna coupling coefficient:

$$K_3 = \frac{\omega M_3}{\sqrt{(X_L + \omega M_3)(E + \omega M_3)}}$$

wherein:

$$E = X_A + \frac{(X_R + \omega M_2)\omega M_1}{X_R + \omega(M_1 + M_2)}$$

If we put:

$$\frac{(X_L + \omega M_3)\omega M_2}{X_L + \omega(M_2 + M_3)} = A$$

$$\frac{(X_A + \omega M_1)\omega M_3}{X_A + \omega(M_1 + M_3)} = B$$

$$\frac{(X_R + \omega M_2)\omega M_1}{X_R + \omega(M_1 + M_2)} = C,$$

we obtain therefrom $$Y = X_R + A$$
$$Z = X_L + B$$
$$E = X_A + C$$

and we arrive at the following expressions for the coupling coefficients, $K_1$, $K_2$, and $K_3$:

$$K_1 = \frac{\omega M_1}{\sqrt{(X_A + \omega M_1)(X_R + A + \omega M_1)}} =$$

$$\frac{M_1}{\sqrt{(L_A + M_1)\left[L_R + M_1 + \frac{(L_L + M_3)M_2}{M_2 + L_L + M_3}\right]}}$$

$$K_2 = \frac{\omega M_2}{\sqrt{(X_R + \omega M_2)(X_L + B + \omega M_2)}} =$$

$$\frac{M_2}{\sqrt{(L_R + M_2)\left[L_L + M_2 + \frac{(L_A + M_1)M_3}{M_3 + L_A + M_1}\right]}}$$

$$K_3 = \frac{\omega M_3}{\sqrt{(X_L + \omega M_3)(X_A + C + \omega M_3)}} =$$

$$\frac{M_3}{\sqrt{(L_L + M_3)\left[L_A + M_3 + \frac{(L_R + M_2)M_1}{M_1 + L_R + M_2}\right]}}$$

From the last expressions it becomes obvious that $K_1$, $K_2$ and $K_3$ are not independently variable. It can be shown that a variation of any one of the mutual reactances will affect the other two according to parabolic functions with parameters which in turn depend entirely upon the physical construction of the coupling system.

Since the general problem is that of phasing the antenna current with the loop current substantially in a third or collective circuit (receiver circuit) the following facts will immediately become of importance:

As already pointed out $K_3$, i. e., the coupling coefficient between loop and antenna plate circuit must be such that a variation of the loop reactance $X_2$ will in only a small degree affect the already existing phase angle $\theta_3$ between plate voltage $E_p$ and plate current $i_1$, and in particular phase angle $\theta_4$ between induced antenna voltage $E_A$ and plate current $i_1$ (see Fig. 9).

So far the loop circuit has been merely considered as a circuit coupled to the antenna circuit; its effect upon the antenna circuit has been studied relative particularly to variations of its reactance and its mutual relation by a variation of the degree of coupling.

Finally its effect upon the antenna circuit when it is being turned about its vertical axis must be considered. As such the loop circuit becomes now a generator circuit since it will receive energy. The thereby induced loop current depends in phase and amplitude upon the direction of the plane of the loop with respect to the location of the source of transmission and, of course, also upon the adjustment of the loop reactance $X_2$.

Here then it becomes obvious that the loop considered as a generator may be adjusted for both negative and positive reactance either by turning the loop about its axis or by making either positive or negative reactance $X_2$ predominating respectively.

Practical experiments and theoretical studies concerning coupling coefficients $K_1$, $K_2$ and $K_3$ have proved that the relative magnitude of the same is of utmost importance and the results therefrom have led to a special transformer design with the following features:

$K_3$ is much smaller than $K_1$; so is $K_2$; however, $K_1$ and $K_2$ are comparable in magnitude. In doing so it has been possible to accomplish proper phasing by merely adjusting loop tuning capacity $C_2$. It is obvious that in a coupling system such as shown in Fig. 12 the equality of $M_1$ and $M_2$ will result in conditions for maximum efficiency consistent with the optimum minimum coupling $M_1$ and $M_2$.

Previous consideration of a theoretical nature has shown that $M_3$ be kept exceedingly small. By reason of the above, however, this necessitates that $M_2$, i. e., loop to receiver coupling must also be small. $M_2$ on the other hand must be selected such that the maximum loop amplitude is equal to the antenna amplitude, substantially in phase with each other. Therefore, it is necessary to design the loop structure that, when tuned to resonance, its available energy will be several times greater than that of the antenna which, as already stated, is of limited physical dimension so that by virtue of the preselected small coupling $M_2$ the decrease in amplitude due to phasing of $X_2$ will render said amplitude still sufficient to form, in combination with the antenna amplitude, a directional characteristic substantially that of a cardioid figure.

In Fig. 14 is shown the relation between sense and magnitude of the loop reactance $X_2$ in function of variations of frequency at constant capacity $C_2$ settings or of variations in capacity $C_2$ setting for a given constant frequency.

It is well known in the art that in an electrostatic absorbing means such as an antenna the individual antenna voltage is in phase with the electrostatic component of the electromagnetic wave, whereas the induced voltage in a loop circuit must essentially be in phase with the electromagnetic component of the same. Since the electrostatic and electromagnetic components of the wave are timely and in space, that is, in a plane at right angles to the direction of propagation, 90 degrees displaced, it follows that the induced voltages of antenna and loop are 90 degrees out of phase.

It can be seen from Fig. 8 and Fig. 8A that if we assume the antenna circuit to be tuned to resonance and inductively coupled to the loop circuit, the thereby induced antenna voltage in the loop circuit must be 90 degrees lagging with respect to the antenna current, so that, as represented by vector diagram of Fig. 15, said voltage $E_L$ will be in phase with the voltage induced in and by the loop antenna $E_1$.

In the case where the antenna current $i_1$ is leading with respect to the induced antenna voltage $E_A$ as illustrated in Fig. 16, the summation of $E_1$ and loop voltage $E_L$ will have to be performed vectorially.

If we should attempt to determine the directional characteristics under these conditions, it becomes obvious that the method employed in the construction of the sum of loop voltage and antenna voltage or likewise loop current and antenna current respectively, as shown in Fig. 5, it must likewise be performed vectorially as shown in Fig. 16. The directional characteristic will then no longer be a cardioid $S_0$ but a configuration represented by $S_t$. (See Fig. 17.)

In radio compasses of this character, visual right and left indications are obtained by periodically reversing the polarity of one antenna means with respect to the other so that the field amplitude received is equal to O—B during one reversal and O—A during the next (see Fig. 18). Since the indicator as shown in Fig. 3 will receive periodic impulses in opposite directions and in synchronism with said periodic reversals of antenna or loop currents with respect to each other, it is readily seen that the sensitivity of indication must be a function of the difference between field amplitudes O—B and O—A respectively, that is, a function of A—B.

As has been shown in Fig. 17, the combined characteristic of loop and antenna in the case of an unphased condition existing between the respective antennae currents will no longer result in a cardioid but in a configuration represented by curve $S_\theta$. The difference between amplitudes of two subsequent configurations $S_\theta$ is seen to be much smaller, namely, A—B in Fig. 19. Out of phase conditions between the two antennae circuits must therefore result in a substantial decrease in sensitivity and receiving range of the apparatus.

In an antenna and loop coupling system as shown in Fig. 8 and Fig. 8A, the relative phase difference between the antenna voltage induced through mutual coupling in the loop circuit $L_2$, $C_2$ and the induced loop voltage $E_L$ contributed by the loop circuit itself may not be altered if the total energy received at the input circuit of the receiver is obtained by virtue of the loop-receiver coupling alone. This holds true with respect to any tuning adjustment that may be performed in the loop circuit $L_2$, $C_2$ by, for instance, varying loop tuning condenser $C_2$. This latter feature is further illustrated in Fig. 15. Whereas it may be possible to bring the two vectors $E_L$ and $E_1$ in phase by suitably choosing the constants of the antenna circuit so that $i_1$ comes into phase with $E_A$ it is impossible to alter the phase of the induced loop voltage $E_L$ since the latter, irrespective of the constants $L_2$ and $C_2$ will by natural laws be in quadrature with the electrostatic component of the incoming radio wave.

With reference to the loop circuit $L_2$, $C_2$ shown in Fig. 8 and Fig. 8A, Fig. 20a and Fig. 20b show the phase relation between loop current and voltage existing when a. The loop is made to be a capacitive reactance corresponding to tuning point A (Fig. 14), and b. The loop is made to be an inductive reactance corresponding to tuning point B (Fig. 14).

A comparison between said two vector diagrams shows that the sum of antenna and loop currents is vectorially respectively approximately 180 degrees displaced with respect to the electrostatic component of the incoming wave. This will, of course, result in a reversal of bearing indication.

If, therefore, it is desired to maintain the sense of bearing indication over the entire frequency range to which the receiver may be tuned, special care must be taken to adjust the loop circuit reactance so that it has substantially the same sense over said frequency range.

This result is obtained by matching the frequency characteristic of the receiver circuit proper with that of the loop circuit such that the respective curves have the same slope and run parallel to each other.

If the two curves should intersect at any one point (see Fig. 21) P, for instance, the sense of directional indication will reverse itself thereby resulting in a 180 degree ambiguity which is objectionable. By taking the above precautions in the design of the loop circuit, said 180 degree ambiguity is successfully avoided.

Considering now Fig. 18, it may be noted that the two null points $P_1$ and $P_2$, lying in directions $D_1$ and $D_2$ respectively, are exactly 180 degrees apart consistent with the assumption made that the two cardioids are equal and opposite during successive reversals of antenna effect with respect to the loop effect or vice versa.

It has been found in practice, however, that the heretofore made assumption is not justified in that, due to certain dissymmetries one cardioid is larger than the succeeding one during these reversals (see Fig. 23). In accordance therewith the null points $P_1$ and $P_2$ are no longer 180 degrees, but respectively $180\pm\alpha$ degrees apart, a feature which is very undesirable when a radio compass of this nature is to be used not only as a homing device but as a direction finder as well.

Reference is now made to the coupling system as shown in Fig. 12. It may be seen, therefrom, that the ground connection of the receiver circuit is not symmetrical with respect to that of both the antenna and loop circuit. This has primarily the effect of increasing the effective coupling between $L_{P1}$ and $L_R$ relative to coupling $$L_{P_2}-L_R.$$

If it is, for the moment, assumed that the plate circuit impedances and capacitive reactances $$Z_{LP_1}, \frac{1}{j\omega C_1'}$$

and $$Z_{LP_2}, \frac{1}{j\omega C_2'}$$

respectively, are so adjusted that they are equal in magnitude and phase, it can readily be seen that, due to the influence of said unbalanced condition existing in the receiver circuit the magnitude of antenna effects respectively being present in said receiver circuit during successive half cycles of the operation of the balanced modulator circuit cannot be the same. Therefore, whereas during one half cycle (see Fig. 22) the antenna effect is graphically illustrated by polar vector R, it will, during the next half cycle, be equal to R', Fig. 23, with the consequent result that the polar diagrams of the respective directional receiving characteristics are that of A (Fig. 22) and B (Fig. 23). The superposition of curve A upon that of B (see dotted curve Fig. 23) results in a decided error in the reciprocal bearing relation, namely $\alpha$.

This undesirable feature may be overcome either by balancing the receiver input circuit with respect to ground or by unbalancing one of the two condensers $C_1'$, $C_2'$, Fig. 12, so that the available energy existing in the receiver circuit and furnished by the plate circuits $$L_{P_1} \text{ and } L_{P_2}$$

will be substantially the same, thus rendering R=R' during successive half cycles. (See Figs. 22 and 23.)

The adjustment of either $C_1'$ or $C_2'$ necessarily means the reducing of the greater cardioid to the size of the smaller cardioid with consequent sacrifice of sensitivity and range for the sake of true reciprocal bearings. However, the use of a separate adjusting circuit will allow the smaller cardioid to be increased to the size of the larger, thus actually resulting in a gain of both sensitivity and range.

Likewise, it is found that identical conditions may exist when the amplification factors of the two modulator tubes differ in value. The adjustment of either $C_1'$ or $C_2'$ will in both cases overcome the above noted objectionable feature.

Operation of the device

The operator in order to ascertain the station from which the signal is received will place switch 104 in the "phone" position and the switch 44 in the "on" position and will listen in for the station by turning the tune control 34 to the proper frequency setting, at the same time adjusting the volume control 36 to a suitable signal strength. Having obtained the desired station toward which the pilot intends to direct his airplane he will reduce the volume control to the zero position on the volume control knob. The switch 104 is then moved to the "compass" position and if the pointer on the galvanometer 40 does not register "zero" the balance adjustment wheel 120 is actuated to bring about the zero indication on the radio compass indicator or galvanometer 40. The volume control is now gradually increased until a visual right or left indication on the indicator is obtained, whence the sense of direction of the station relative to the airplane is indicated by the pointer 7—7. To position the longitudinal axis of the airplane so that it is in coincidence with a straight line between the transmitting station and the radio apparatus, the pilot will steer the airplane in the direction indicated by the pointer until the pointer reads "zero"

I claim:

1. In a directional antenna system comprising, a generating circuit having an electromotive force and a current of given frequency and amplitude, said current being materially out of phase with said electromotive force, a second generating circuit having a current of like frequency, but variable in phase and amplitude, a collective circuit and coupling means between said circuits for combining the current effects of said generating circuits in said collective circuit to produce a resultant current having a uni-directional characteristic, the constants and arrangements of the circuits being such that the coupling coefficient between each of said generating circuits and said collective circuit is greater than the coupling coefficient between the generating circuits themselves, the latter coupling coefficient being sufficiently small to enable the obtainment in said collective circuit of a substantial coincidence of the phase of the currents flowing in one of said generating circuits with that flowing in the other of said generating circuits.

2. In a directional antenna system comprising, directional antenna means, non-directional antenna means, tunable and phase shifting means associated with one of said antenna means, a collective circuit connected to both of said antenna means for combining the current effects in said collective circuit to produce a resultant current having a uni-directional characteristic, the constants and arrangements of both said antenna means and said collective circuit being such that the coupling coefficient between each of said antenna means and said collective circuit is greater than the coupling coefficient between said antenna means themselves, the latter coupling coefficient being sufficiently small to enable the obtainment in said collective circuit and throughout a given frequency band, of substantial coincidence of the phase of the currents flowing in one of said antenna means with that flowing in the other antenna means.

3. In a directional antenna system comprising, a non-directional circuit having an electromotive force and a current of given phase and amplitude and frequency, said current being materially out of phase with said electromotive force, a directional antenna circuit having an electromotive force greater than that of said first-mentioned antenna circuit with a current of like frequency, but variable in phase and amplitude, a collective circuit connected to both said antenna circuits for combining the current effects of said antenna circuits in said collective circuit to produce a resultant current having a uni-directional characteristic, a constants and arrangements of said circuits being such that the coupling coefficient between each of said antenna circuits and said collective circuit is greater than the coupling coefficient between the antenna circuits themselves, the latter coupling coefficient being substantially small to enable the obtainment of a substantially in-phase relation of said antenna currents in said collective circuit and the former coupling coefficients being respectively of such magnitude as to render the energy transfer from said directional antenna circuit to said collective circuit substantially equal to that transmitted from the other antenna circuit in two given directions 180° apart.

4. In a directional antenna system comprising, a non-directional antenna circuit, a directional antenna circuit, tunable and phase shifting means associated with one of said circuits for varying the effects thereof, a collective circuit connected to both of said circuits for combining the current effects thereof in said collective circuit to produce a resultant current having a uni-directional characteristic, the constants and arrangements of both said antenna circuits and said collective circuit being such that the coupling coefficient between said antenna circuits is not greater than the individual coupling coefficient between either antenna circuit and collective circuit, nor smaller than said individual coupling coefficients considered in series whereby substantial coincidence of the phase of the currents flowing directly from said antenna circuits to said collective circuits is obtained for each adjustment of said tunable means.

5. A directional receiving apparatus comprising in combination, an antenna circuit having an electromotive force and a current of given frequency, amplitude and phase and having a non-directional characteristic, said current being materially out of phase with said electromotive force, a second antenna circuit having an electromotive force differing in phase from the electromotive force of said first-mentioned circuit and with a current of like frequency, but variable in phase and amplitude with respect to the second-mentioned electromotive force and reversing means associated with one of said circuits for periodically, alternately reversing the phase thereof, a collective circuit connected to both of said circuits for combining the current effects thereof in said collective circuit, the constants and arrangements of said antenna circuits and said collective circuit being such that the coupling coefficient between each of said antenna circuits and said collective circuit is greater than the coupling coefficient between the antenna circuits themselves, the latter coupling coefficient being sufficiently small such that a substantial constant in-phase relation of the currents of said antenna circuits is obtained in said collective circuit for each adjustment of said second-mentioned circuit for a given band of frequencies, and means utilizing the energy flowing in said collective circuit for producing indications.

6. A directional receiving apparatus comprising, in combination, a non-directional antenna system, a directional antenna system, tunable and phase shifting means in one of said antenna systems, a collective circuit coupled to both said antenna systems and having a tunable means, means connecting both said means to operate in unison, the constants and arrangements of said antenna systems and said collective circuit being such that the coupling coefficient between each antenna system and said collective circuit is greater than the coupling coefficient between said systems themselves, the latter coupling coefficient being sufficiently small such that a substantially constant in-phase relation of the currents of said systems is obtained in said collective circuit for each adjustment of both said tunable means for a given band of frequencies, and means utilizing the energy flowing in said collective circuit for producing indications.

7. In a directional antenna system comprising, a generating circuit having an electromotive force and a current of given frequency, amplitude and phase and having a non-directional characteristic, said current being materially out of phase with said electromotive force, a second generating circuit having an electromotive force differing in phase from the electromotive force of said first-mentioned generating circuit and with a current of like frequency, but variable in phase and amplitude with respect to the second-mentioned electromotive force, a reversing circuit having two circuit branches alternately operated and associated with one of said generating circuits for periodically reversing the phase thereof, a collective circuit, coupling means between said circuits for combining the current effects of said generating circuits in said collective circuit, the constants and arrangements of said circuits being such that the coupling coefficient between each of said generating circuits and said collective circuit is greater than the coupling coefficient between the generating circuits themselves, the latter coupling coefficient being sufficiently small so that a substantially constant in-phase relation of the currents of said generating circuits is obtained in said collective circuit for each adjustment of said variable generating circuit over a given frequency band, and balancing means associated with said branch circuits for rendering the coupling coefficients between each of said branch circuits and the second-mentioned generating circuit and collective circuit of such magnitude as to obtain equal energy transfers during successive half cycles of the reversing means in order to thereby produce null points 180° apart.

8. A directional receiving apparatus comprising, in combination, an antenna circuit having an electromotive force and a current of given frequency, amplitude and phase and having a non-directional characteristic, said current being materially out of phase with said electromotive force, a second antenna circuit having an electromotive force differing in phase from the electromotive force of said first-mentioned circuit and with a current of like frequency but variable in phase and amplitude with respect to said second-mentioned electromotive force, a reversing circuit having two circuit branches alternately operative and associated with one of said circuits for periodically reversing the phase thereof, a collective circuit, coupling means between said circuits for combining the current effects of said antenna circuits in said collective circuit, constants and arrangements of said circuits being such that the coupling coefficient between each of said branch circuits and said other antenna circuit is less than the respective coupling coefficients between each branch and collective circuit and the other antenna circuit and collective circuit, but sufficiently small to enable the obtainment of a substantially constant in-phase relation with the currents of said antenna circuits in said collective circuit for each adjustment of said variable antenna circuit over a given frequency band, and means for utilizing the energy flowing in said collective circuit for producing indications.

9. A directional receiving apparatus comprising, in combination, an antenna circuit having an electromotive force and a current of given frequency, amplitude and phase and having a non-directional characteristic, said current being materially out of phase with said electromotive force, a second antenna circuit having an electromotive force differing in phase from the electromotive force of said first-mentioned circuit and with a current of like frequency, but variable in phase and amplitude with respect to said second-mentioned electromotive force, a reversing circuit having two circuit branches alternately operative and associated with one of said circuits for periodically reversing the phase thereof, a collective circuit, coupling means between said circuits for combining the current effects of said antenna circuits in said collective circuit, the constants and arrangements of said circuits being such that the coupling coefficient between each of said branch circuits and said other antenna circuit is less than the respective coupling coefficients between each branch circuit and collective circuit and that of said other antenna circuit and collective circuit, but sufficiently small to enable the obtainment of a substantially constant in-phase relation of the currents of said antenna circuits in said collective circuit for each adjustment of said variable antenna circuit over a given frequency band, balancing means associated with said branch circuits for rendering the respective coupling coefficients between each of said branches and the second-mentioned antenna circuit of such magnitude as to obtain equal energy transfers during successive half cycles of the reversing means in order to thereby produce null points 180° apart, and means for utilizing the energy flowing in said collective circuit for producing indications.

10. In a directional antenna system comprising, in combination, antenna means having directional and non-directional characteristics, coupling means for combining said antenna effects to obtain a cardioid characteristic, a collective circuit and reversing means associated with said antenna means for alternately periodically obtaining the reversal of the cardioid characterisctic in said collective circuit, said reversing means having branch circuits, and balancing means operatively connected with said branch circuits and antenna means for adjusting the amplitude of the radio frequency current of one branch with respect to that of the other to thereby obtain two null points substantially 180° apart upon said reversal of said cardioid characteristic.

11. In a directional receiving system, an antenna circuit having a given electromotive force and a current materially out of phase with said electromotive force, said antenna circuit having a non-directional characteristic, a second antenna circuit having an electromotive force out of phase with the electromotive force of said first-mentioned circuit and having a directional characteristic, adjusting means associated with one of said antenna circuits for varying the phase relation between its electromotive force and corresponding current, a receiving circuit coupled to each of said antenna circuits for combining the current effects of said antenna circuits in said receiving circuit and having means for tuning the same to any one of a given range of frequencies, the constants and arrangements of said circuits being such that the coupling coefficient between said antenna circuits is not greater than the individual coupling coefficients between either antenna circuit and receiving circuit nor smaller than said individual coupling coefficients considered in series, and means operatively connecting said variable means and said tuning means for obtaining a phase relation between the electromotive force and current of the one antenna circuit for each frequency to which said receiving circuit is tuned that will be substantially similar to the phase relation between the electromotive force and current of the other antenna circuit for corresponding frequencies.

12. In a directional receiving system, a generating circuit having a given electromotive force and a generated current materially out of phase with said electromotive force, said generating circuit having a non-directional characteristic, a second generating circuit having an electromotive force out of phase with the electromotive force of said first-mentioned circuit and having a directional characteristic, adjusting means associated with one of said generating circuits for varying the phase relation between its electromotive force and corresponding current, a reversing circuit having two circuit branches alternately operative and associated with one of said generating circuits for periodically reversing the phase thereof, a receiving circuit having means for tuning same to any one of a given range of frequencies, coupling means between each of said circuit branches and the other generating circuit and said receiving circuit, the constants and arrangements between said circuits being such that the coupling coefficients between each branch circuit and receiving circuit are greater than the coupling coefficients between said branch circuits and said other antenna circuit respectively, the latter coupling coefficients being sufficiently small to enable the obtainment of a substantially in-phase relation of the currents of said generating circuits in said receiving circuit, balancing means associated with said branch circuits for rendering the respective coupling coefficients between each of said branches and the second-mentioned generating circuit of such magnitude as to obtain equal energy transfers during successive half cycles of the reversing means to thereby produce null points 180° apart, and means operatively connecting said variable means and said tuning means for obtaining a phase relation between the electromotive force and current of the one generating circuit for each frequency to which said receiving circuit is tuned that will be substantially similar to the phase relation between the electromotive force and current of the other generating circuit for corresponding frequencies.

13. In a directional antenna system comprising, in combination, antenna means having a directional loop effect and a non-directional antenna effect, coupling means for combining said antenna effects to obtain a cardioid characteristic, a balanced modulator circuit associated with said antenna means for alternately periodically obtaining the reversal of said cardioid characteristic and means coupled to said balanced modulator circuit for adjusting the amplitude of the radio frequency current of one tube of said balanced modulator circuit with respect to the other to thereby obtain two null points substantially 180° apart upon said reversal of said cardioid characteristic.

14. In a directional antenna system comprising, in combination, antenna means having a directional loop effect and a non-directional antenna effect, coupling means for combining said antenna effects to obtain a cardioid characteristic, a circuit having two tubes operating alternatively at maximum and minimum amplitude and being associated with said antenna means for alternately periodically obtaining the reversal of said cardioid characteristic and means coupled to said circuit for adjusting the amplitude of the radio frequency current of one tube of said circuit with respect to the other to thereby obtain two null points substantially 180° apart upon said reversal of said cardioid characteristic.

15. A directional receiving system comprising, an antenna circuit having a non-directional characteristic, another antenna circuit having a directional characteristic, a receiver circuit commonly coupled to said antenna circuits in such a manner that the respective currents of said antenna circuits combine in said receiver circuit to produce therein a resultant current having a uni-directional characteristic, said receiver circuit having a variable tuning means and one of said antenna circuits having a means for varying the reactance thereof, the constants and arrangements of said circuits being such that the coupling coefficient between the antenna circuits and said receiver circuit is greater than the coupling coefficients between said antenna circuits themselves, the latter coupling coefficient being sufficiently small to enable the attainment of an in-phase relation of the currents of said antenna circuits in said collective circuit, and means for connecting both of said variable tuning means in such manner that for each adjustment of said tuning element over a given frequency range there will be produced in said receiver circuit a pre-selected frequency characteristic that is different from the characteristic of said receiving circuit, but corresponds to the frequency characteristic of the other antenna circuit to bring about an in-phase condition between the respective antenna currents over a given frequency range.

16. A directional antenna system for transmitting or receiving comprising, an antenna having a directional characteristic, another antenna having a non-directional characteristic, a collective circuit connected to both of said antenna circuits, the constants and arrangements for said circuits being such that the coupling coefficient between each of said generating circuits and said collective circuit is greater than the coupling coefficient between the generating circuits themselves, the latter coupling coefficient being sufficiently small to enable the attainment in said collective circuit and throughout a given frequency band of an in-phase relation of the currents of said antenna circuits, said currents having substantially equal amplitudes in two directions 180° apart whereby a directional diagram of substantially constant form is obtained.

17. A directional antenna system for transmitting or receiving comprising, an antenna circuit having a directional characteristic, another antenna having a non-directional characteristic, tunable and phase shifting means associated with one of said antenna circuits for varying the effects thereof, a collective circuit having a tunable means, means connecting said tuning elements to operate in unison, said antenna circuits and said collective circuit having such constants and arrangements that the coupling coefficient between the antenna circuits and collective circuit is greater than the coupling coefficient between the antenna circuits themselves, the latter coupling coefficient being substantially small and the former coupling coefficients having such magnitudes that for each adjustment of both said tunable means a directional diagram of substantially constant form is obtained.

18. A directional antenna system for transmitting or receiving comprising, an antenna circuit having a directional characteristic, another antenna having a non-directional characteristic, tunable and phase shifting means associated with one of said antenna circuits for varying the effects thereof, a collective circuit having a tunable means, means connecting said tuning means to operate in unison, said antennae and said collective circuit having such constants and arrangements that the coupling coefficient between the antenna circuits and collective circuit is greater than the coupling coefficient between the antenna circuits themselves, the latter coupling coefficient being substantially small and the former coupling coefficients having such magnitude that for each adjustment of both said tunable means a directional diagram of substantially constant form is obtained, and a device associated with one of said antenna circuits for periodically, alternately reversing the phase of the current thereof and including means for maintaining the form of said directional diagram substantially the same during successive reversals.

19. In a directional receiving apparatus comprising in combination, a directional antenna system, a non-directional antenna system, a tunable element associated with one of said system for varying the effects thereof, a collective circuit connected to both said systems and having a tunable element and means connecting said tunable elements to operate in unison, said systems and said collective circuit having such constants and arrangements that the coupling coefficient between each of said systems and said collective circuit is greater than the coupling coefficient between said systems themselves, the latter coupling coefficient being sufficiently small so that a substantially constant relation of the phase of the currents of said system is obtained in said collective circuit for each adjustment of both said tuning elements over a given frequency band.

20. In a radio compass for operating at any selected frequency of a given range of signal frequencies, a directional antenna system, a collector circuit, means for setting up in said collector circuit a plurality of currents derived from said antenna system and for causing said currents throughout said given frequency range to be either substantially in phase with each other, or substantially 180° out of phase, depending upon the direction in which the signal deviates from a given zero axis, said means comprising a plurality of paths from said antenna system to said collector circuit, phase adjusting means for adjusting the relative phase relationship of the currents in said paths, the coupling between said paths, as compared to the coupling between said paths and said collector circuit respectively, being sufficiently small to permit of accuracy in such phase adjustment for any selected frequency of said frequency range; tuning means for causing said collector circuit to be effective at any selected frequency of said given frequency range; a single controlling device for operating said phase adjusting means, and said tuning means in unison, so that the compass may be rendered accurately effective for any frequency in said given range by the manipulation of said single controlling device, the constants and arrangements of the circuits of which said phase adjusting means and said tuning means constitute parts, being such that over said given frequency range a change in the setting of said single controlling device from one frequency position to any other will serve to render the collector circuit effective and simultaneously change the constants of the circuit comprising said phase adjusting means in such manner that, at such other new setting of said controlling device the currents set up in said collector circuit will again be either substantially in phase with each other or 180° out of phase; and means whereby said currents in said collector circuit are caused to provide a visual indication of the direction in which the signal deviates from said given zero axis.

21. In a radio compass for operating at any selected frequency of a given range of signal frequencies, a directional antenna system, a collector circuit, means for setting up in said collector circuit a plurality of currents derived from said atenna system and for causing said currents throughout said given frequency range to be either substantially in phase with each other, or substantially 180° out of phase, depending upon the direction in which the signal deviates from a given zero axis, said means comprising a plurality of paths from said antenna system to said collector circuit, phase adjusting means for adjusting the relative phase relationship of the currents in said paths, the coupling between said paths, as compared to the coupling between said paths and said collector circuit respectively, being sufficiently small to permit of accuracy in such phase adjustment for any selected frequency of said frequency range; tuning means for causing said collector circuit to be effective at any selected frequency of said given frequency range; a single controlling device for operating said phase adjusting means, and said tuning means in unison, so that the compass may be rendered accurately effective for any frequency in said given range by the manipulation of said single controlling device, the constants and arrangements of the circuits of which said phase adjusting means and said tuning means constitute parts, being such that over said given frequency range a change in the setting of said single controlling device from one frequency position to any other will serve to render the collector circuit effective and simultaneously change the constants of the circuit comprising said phase adjusting means in such manner that, at such other new setting of said controlling device the currents set up in said collector circuit will again be either substantially in phase with each other or 180° out of phase; and means whereby said currents in said collector circuit are caused to provide a visual indication of the direction in which the signal deviates from said given zero axis; said means comprising means for causing the periodic reversal of the current of the one path with reference to that of the other, and adjusting means for causing the effect of the current subjected to reversal to be substantially equal in magnitude in said collector circuit, whether said current is flowing in the one direction or in the other.

22. In a radio compass for operating at any selected frequency of a given range of signal frequencies, a directional antenna system, a collector circuit, means for setting up in said collector circuit a plurality of currents derived from said antenna system and for causing said currents throughout said given frequency range to be either substantially in phase with each other, or substantially 180° out of phase, depending upon the direction in which the signal deviates from a given zero axis, said means comprising a plurality of paths from said antenna system to said collector circuit, phase adjusting means for adjusting the relative phase relationship of the currents in said paths, the coupling between said paths, as compared to the coupling between said paths and said collector circuit respectively, being sufficiently small to permit of accuracy in such phase adjustment for any selected frequency of said frequency range; tuning means for causing said collector circuit to be effective at any selected frequency of said given frequency range; a single controlling device for operating said phase adjusting means, and said tuning means in unison, so that the compass may be rendered accurately effective for any frequency in said given range by the manipulation of said single controlling device, the constants and arrangements of the circuits of which said phase adjusting means and said tuning means constitute parts, being such that over said given frequency range a change in the setting of said single controlling device from one frequency position to any other will serve to render the collector circuit effective and simultaneously change the constants of the circuit comprising said phase adjusting means in such manner that, at such other new setting of said controlling device the currents set up in said collector circuit will again be either substantially in phase with each other or 180° out of phase; and means whereby said currents in said collector circuit are caused to provide a visual indication of the direction in which the signal deviates from said given zero axis; said means comprising a balanced modulator in said one path, said modulator having its output circuit coupled with said collector circuit, said output circuit comprising a pair of branch circuits having adjustable reactances for equalizing the energy flow from said branch circuits to said collector circuit respectively, during successive reversals in the operation of the balanced modulator.

23. In a radio compass for operating at any selected frequency of a given range of signal frequencies, a directional antenna system, a collector circuit, means for setting up in said collector circuit a plurality of currents derived from said antenna system and for causing said currents throughout said given frequency range to be either substantially in phase with each other, or substantially 180° out of phase, depending upon the direction in which the signal deviates from a given zero axis, said means comprising a plurality of paths from said antenna system to said collector circuit, phase adjusting means for adjusting the relative phase relationship of the currents in said paths, the coupling between said paths, as compared to the coupling between said paths and said collector circuit respectively, being sufficiently small to permit of accuracy in such phase adjustment for any selected frequency of said frequency range; the coupling between said paths and said collector circuit being comprised of a plurality of coils, one in each path and one in said circuit the coil of said one path being divided into a plurality of parts, said coils being so constructed and arranged with reference to each other that the coupling co-efficient from the coil of said other path to the divided coil of said one path is substantially less than the coupling co-efficient between said coil of said other path and the coil of the collector circuit and also substantially less than the coupling co-efficient between each part of the divided coil and the coil of the collector circuit, tuning means for causing said collector circuit to be effective at any selected frequency of said given frequency range; a single controlling device for operating said phase adjusting means, and said tuning means in unison, so that the compass may be rendered accurately effective for any frequency in said given range by the manipulation of said single controlling device, the constants and arrangements of the circuits of which said phase adjusting means and said tuning means constitute parts, being such that over said given frequency range a change in the setting of said single controlling device from one frequency position to any other will serve to render the collector circuit effective and simultaneously change the constants of the circuit comprising said phase adjusting means in such manner that, at such other new setting of said controlling device the currents set up in said collector circuit will again be either substantially in phase with each other or 180° out of phase; and means whereby said currents in said collector circuit are caused to provide a visual indication of the direction in which the signal deviates from said given zero axis.

24. In a radio compass for operating at any selected frequency of a given range of signal frequencies, a directional antenna system, a collector circuit, means for setting up in said collector circuit a plurality of currents derived from said antenna system and for causing said currents throughout said given frequency range to be either substantially in phase with each other, or substantially 180° out of phase, depending upon the direction in which the signal deviates from a given zero axis, said means comprising a plurality of paths from said antenna system to said collector circuit, phase adjusting means for adjusting the relative phase relationship of the currents in said paths, the coupling between said paths, as compared to the coupling between said paths and said collector circuit respectively, being sufficiently small to permit of accuracy in such phase adjustment for any selected frequency of said frequency range; the coupling between said paths and said collector circuit being comprised of a plurality of coils, one in each path, and one in said circuit, the coil of said one path being divided into a plurality of parts, said coils being so constructed and arranged with reference to each other that the coupling co-efficient from the coil of said other path to the divided coil of said one path is substantially less than the coupling co-efficient between said coil of said other path and the coil of the collector circuit and also substantially less than the coupling co-efficient between each part of the divided coil and the coil of the collector circuit, the divided coil of said one path being arranged symmetrically with reference to the coil of said other path and with reference to the coil of said collector circuit, said coil of said other path being disposed intermediate the portions of said divided coil, tuning means for causing said collector circuit to be effective at any selected frequency of said given frequency range; a single controlling device for operating said phase adjusting means, and said tuning means in unison, so that the compass may be rendered accurately effective for any frequency in said given range by the manipulation of said single controlling device, the constants and arrangements of the circuits of which said phase adjusting means and said tuning means constitute parts, being such that over said given frequency range a change in the setting of said single controlling device from one frequency position to any other will serve to render the collector circuit effective and simultaneously change the constants of the circuit comprising said phase adjusting means in such manner that, at such other new setting of said controlling device the currrents set up in said collector circuit will again be either substantially in phase with each other or 180° out of phase; and means whereby said currents in said collector circuit are caused to provide a visual indication of the direction in which the signal deviates from said given zero axis.

25. In a radio compass for operating at any selected frequency of a given range of signal frequencies, a directional antenna system, said directional antenna system comprising a straight antenna and a loop antenna, a collector circuit, means for setting up in said collector circuit a plurality of currents derived from said antenna system and for causing said currents throughout said given frequency range to be either substantially in phase with each other, or substantially 180° out of phase, depending upon the direction in which the signal deviates from a given zero axis, said means comprising a plurality of paths from said antenna system to said collector circuit, said path from said straight antenna to the collector circuit comprising a balanced modulator so that the carrier frequency supplied from said straight antenna to said collector circuit is eliminated by said balanced modulator and in case the incoming signal is in alignment with the said zero axis only the side band frequencies are supplied to said collector circuit, phase adjusting means for adjusting the relative phase relationship of the currents in said paths, the coupling between said paths, as compared to the coupling between said paths and said collector circuit respectively, being sufficiently small to permit of accuracy in such phase adjustment for any selected frequency of said frequency range; tuning means for causing said collector circuit to be effective at any selected frequency of said given frequency range; a single controlling device for operating said phase adjusting means, and said tuning means in unison, so that the compass may be rendered accurately effective for any frequency in said given range by the manipulation of said single controlling device, the constants and arrangements of the circuits of which said phase adjusting means and said tuning means constitute parts, being such that over said given frequency range a change in the setting of said single controlling device from one frequency position to any other will serve to render the collector circuit effective and simultaneously change the constants of the circuit comprising said phase adjusting means in such manner that, at such other new setting of said controlling device the currents set up in said collector circuit will again be either substantially in phase with each other or 180° out of phase; and means whereby said currents in said collector circuit are caused to provide a visual indication of the direction in which the signal deviates from said given zero axis, said means comprising a detector and an indicator responsive to the output of said detector, said detector being ineffective in the absence of the carrier to supply actuating current to said indicator.

GEOFFREY G. KRUESI.